United States Patent [19]

Pohl

[11] Patent Number: 4,697,413
[45] Date of Patent: Oct. 6, 1987

[54] METHOD OF COOLING PARTIAL OXIDATION GAS CONTAINING FINELY DIVIDED IMPURITIES AND USED FOR COMBUSTION IN A COMBINED GAS-STEAM TURBINE OF A POWER PLANT

[76] Inventor: Hans C. Pohl, Vormholzerstrasse 114, 5810 Witten, Fed. Rep. of Germany

[21] Appl. No.: 807,438

[22] Filed: Dec. 9, 1985

[30] Foreign Application Priority Data

Dec. 21, 1984 [DE] Fed. Rep. of Germany ....... 3446715

[51] Int. Cl.$^4$ ............................. F02C 3/30; F02C 3/28
[52] U.S. Cl. ................................. 60/39.02; 48/197 R; 60/39.12; 60/39.182
[58] Field of Search ............... 60/39.02, 39.12, 39.182; 48/197 R, DIG. 2

[56] References Cited

U.S. PATENT DOCUMENTS

| | | | |
|---|---|---|---|
| 2,699,384 | 1/1955 | Perry et al. | 48/DIG. 2 |
| 4,013,427 | 3/1977 | Gernhardt et al. | 48/197 R |
| 4,019,314 | 4/1977 | Springmann | 60/39.12 |
| 4,149,859 | 4/1979 | Vigesdal | 48/197 R |
| 4,212,160 | 7/1980 | Blaskowski | 60/39.12 |
| 4,261,167 | 4/1981 | Paull et al. | 60/39.02 |

FOREIGN PATENT DOCUMENTS 2429993 1/1984 Fed. Rep. of Germany .

*Primary Examiner*—Peter Kratz

[57] ABSTRACT

A method of cooling partial oxidation gas entraining finely divided impurities employs nitrogen obtained as a by-product in a low temperature air decomposing plant delivering oxygen into a gasifier where a fuel is partially oxidized at a temperature above slag melting point. Crude gas exiting from the gasifier is quenched by the admixture of nitrogen to a temperature immediately below the fusing of softening point of dust particles entrained in the crude gas. Then the mixture is indirectly cooled in a waste heat boiler and subsequently additionally cooled in a second gas quencher by the admixture of further nitrogen. Nitrogen remains admixed to the gas during subsequent separating and desulphurizing treatment and is also supplied in the combustion chamber of a gas turbine.

1 Claim, 1 Drawing Figure

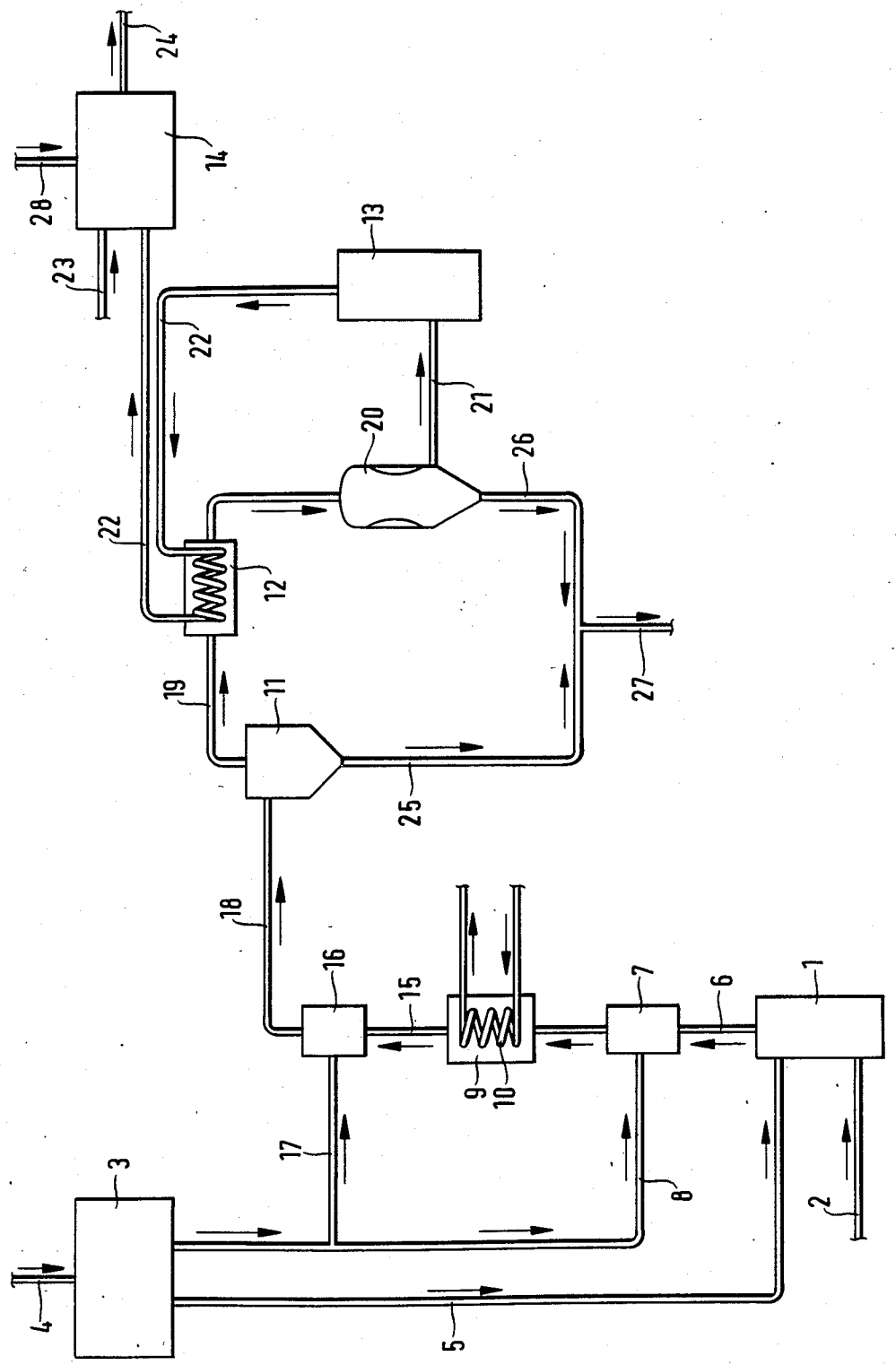

METHOD OF COOLING PARTIAL OXIDATION GAS CONTAINING FINELY DIVIDED IMPURITIES AND USED FOR COMBUSTION IN A COMBINED GAS-STEAM TURBINE OF A POWER PLANT

BACKGROUND OF THE INVENTION

The present invention relates in general to the processing of partial oxidation gas produced by gasification of fuels in a gasifier at a temperature above melting point of slag and containing finely divided impurities. The crude gas upon its discharge from the gasifier is normally cooled in an indirect cooling system whereby the exchanged heat is used for the production of steam and upon cooling dust particles are separated in one or more dust separating stages. The cooled and cleaned gas is desulphurized and supplied in the combustion chamber of a gas turbine of a combined gas-steam turbine power plant.

In the gas processing method of this kind, it is conventional to feed high temperature partial oxidation crude gas discharged from the gasifier into an indirect cooling system generating waste heat steam which is completely or partially utilized, upon a corresponding overheating if necessary, in steam turbines of the combined gas-steam turbine power plant. The cooled partial oxidation crude gas upon dust separation and desulphurization is fed at a temperature between 600° to 700° C. in the combustion chamber of the gas turbine of the power plant. In this prior art method it is known how to prevent the obstructions in the waste heat boiler caused by sintering of dust particles entrained in the coarse gas stream, namely by solidifying the powdery impurities before their entry into the waste heat boiler by corresponding cooling of the crude gas exiting from the gasifier. In conventional methods, this gas cooling or quenching has been made, for example by sprinkling the crude gas with cold water.

In the German Patent DE-PS No. 24 29 993 a method is described in which the cooling of the crude gas is performed by a partial stream branched from the indirectly cooled gas stream. The branched partial stream is returned into the crude gas between its outlet from the gasifier and its inlet in the waste heat boiler.

Both prior art cooling methods however have certain disadvantages. In quenching by means of water the consumption of waste water is of necessity increased and in considering environment protection regulations which tend to become more and more rigorous, the antipollution measures become more expensive. In quenching by means of the returned gas stream it is always necessary to give outlets to the entire enthalpy of the produced crude gas stream between the gasifier and the reception point of the returned partial stream of gas through the indirect cooling in the waste heat boiler. Accordingly, a corresponding dimensioning of the heat exchanging surfaces in the waste heat boiler is needed.

The procurement and operation of such a waste heat boiler, however, is expensive inasmuch as large heat exchanging surfaces of high temperature and corrosion resistant material are necessary, whereby with decreasing gas temperature at the outlet from the waste heat boiler the requirements put on heat exchanging surfaces increase disproportionally. In addition, the operation of the waste heat boiler becomes more expensive due to the fact that the heat exchanging surfaces are subject to a permanent soiling by impurities contained in the crude gas and must be periodically cleaned by soot blowers or by acoustic devices. In the intervals between two cleaning periods the steam producing efficiency of the boiler deteriorates proportionally with the increased soiling.

Since the produced partial oxidation gas is to be processed in subsequent gas-steam turbine power plants, it must be taken also into consideration the fact that according to the contemporary state of the art the steam turbine process has normally a worse degree of efficiency than the gas turbine process. In order to compensate this difference, it is necessary to overheat at a high pressure the waste heat steam generated during the cooling of the partial oxidation has and accordingly this contributes to a further increase of operational costs of the waste heat boiler.

SUMMARY OF THE INVENTION

It is therefore a general object of this invention to provide an improved cooling method of the above-dscribed kind in which the disadvantages encountered in quenching with water and/or with returned cooled down gas are eliminated.

Another object of this invention is to provide such an improved cooling process in which energy applied to the gas turbine process is held at maximum while energy applied to the steam turbine process is correspondingly decreased. In this manner the total efficiency of the combined gas-steam turbine processes is improved and the waste heat boiler system for the indirect gas cooling is simplified and reduced in size.

In keeping with these objects and others which will become apparent hereafter, one feature of the method of this invention resides in the steps of quenching the crude gas exiting from the gasifier by the admixture of nitrogen to a temperature in the range between 900° to 1,000° C. and adjusting within this temperature range the temperature of the gas/nitrogen mixture immediately below fusing or softening point of dust particles entrained in the mixture; then feeding the mixture into an indirect cooling system where the exchanged heat is utilized for steam generation; then separating the finely divided impurities from the mixture; desulphurizing the clean mixture and feeding the same into a combustion chamber of a gas turbine of a combined gas-steam turbine power plant.

In comparison with conventional methods, the quenching of the hot crude gas exiting from the gasifier is not performed by water or returned cooled down partial oxidation gas but is made instead by nitrogen. It should be taken into consideration that normally oxygen is needed for the gasification of a fuel and the oxygen must be produced in an air decomposing installation assigned to the gasifier. In the decomposition of air the requisite nitrogen of necessity is also produced whereby the amount of the generated nitrogen depending on the required purity of oxygen supplied into the gasifier is up to 3.29 times the amount of oxygen. The invention makes use in an advantageous manner the available nitrogen for the quenching of the hot crude gas. The nitrogen supplied in the gas is left therewith and the mixture upon passing through the conventional gas processing stages is introduced in the combustion chamber of the gas turbine where the nitrogen component in the mixture affects in known manner the reduction of combustion temperature and also reduces $NO_x$ contents in the power plant gas. The increase of the volume of the partial oxidation has resulting from the admixture of nitrogen can be put up within the following processing stages.

According to preferred modification of the method of this invention, the nitrogen/gas mixture in the indirect cooling system is cooled down only to a temperature beteen 900° to 500° C. and thereafter by the addition of a further nitrogen it is brought to a temperature between 500° to 150° C. as required for a further gas processing. Which temperature in specific cases is to be adjusted is determined primarily by the temperature level of the subsequent gas desulphurizing stage. By this modification, the proportion of the indirect cooling in the waste heat boiler is still further decreased whereas simultaneously the proportion of the direct gas cooling by the admixture of nitrogen is further increased. Consequently, construction and operational costs of the waste heat boiler are further lowered and its operation is limited to the range of the highest temperature difference between the hot crude gas and the cooling system of the waste heat boiler. Moreover, the participation of the steam turbine in the process of electric power generation is diminished in favor of the gas turbine participation and consequently the total thermal efficiency of the electric power generation is improved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates a flow chart of an exemplary embodiment of the cooling method of this invention. In the flow chart only those stages of a gas cooling system are illustrated which are necessary for the explanation of this invention, whereas all auxiliary devices such as pumps, compressors, valves and the like are omitted for the sake of clarity. The flow chart also does not illustrate the details of the preceding gasification part nor the details of the subsequent gas-steam turbine power plant inasmuch these stages do not participate in this invention. It is assumed that these preceding and subsequent processing stages as well as the devices employed by the method of this invention are of conventional construction.

DESCRIPTION OF THE PREFERRED EMBODIMENT

It will be seen from the drawing that a fuel used in the method of this invention, preferably finely granulated pulverized coal, is supplied via conduit 2 into a gasifier 1. Preferably, the gasifier is a floating steam gasifier which can be driven at an increased pressure. The gasifier 1 cooperates with a low temperature air decomposing plant 3 into which the required amount of air is supplied through conduit 4. Oxygen generated by the low temperature decomposition of air is introduced in the gasifier 1 through conduit 5. The gasification or partial oxidation of coal dust supplied in the gasifier occurs at temperatures between 1400° to 1600° C., that means above the slag melting point. The generated partial oxidation crude gas exits from the gasifier in this example at a temperature of about 1300° C. and at a pressure of about 30 bar and is fed through conduit 6 into a first gas quencher 7.

In the first gas quencher 7 nitrogen originating in the air decomposing plant 3 and fed through conduit 8 is admixed to the hot crude gas. The dust-free stream of gaseous nitrogen can be compressed without problems to the aforementioned operational pressure. Due to the admixture of nitrogen, the hot crude gas is cooled down to a temperature of about 1000° C. This temperature is below the fusing or softening temperature of floating dust particles contained in the crude gas. The mixture of the cooled gas and nitrogen reaches waste heat boiler 9 acting as an indirect cooling system. Due to the indirect cooling the temperature of the gas-nitrogen mixture is lowered to about 700° to 800° C. The spiral pipe or spiral coil 10 is used as a symbol for heat transfer surfaces of the waste heat boiler 9. The waste heat boiler can be for example a so-called radiation boiler. The gas-nitrogen mixture exiting from the waste heat boiler 9 must undergo further cooling to such an extent that upon passing through the separator or hot cyclone 11, and in entering a crude gasclean gas heat exchanger 12 a temperature is obtained which preheats the clean gas discharged from the desulfurizing plant 13 to a suitable and optimized entry temperature for burning in the firebox or combustion chamber 14. For this purpose gas-nitrogen mixture discharged from the boiler 9 via conduit 15 is fed into a second gas quencher 16 in which via a brnched conduit 17 another partial stream of nitrogen delivered from the air decomposing plant 3 at an ambient temperature is additionally admixed to the mixture.

The resulting gas-nitrogen mixture is discharged from the second quencher 16 via conduit 18 and reaches the hot cyclone 11 in which coarse dust particles are separated. If desired, the second gas quencher 16 can be also arranged beyond the hot cyclone 11 upstream of the crude gas-clean gas heat exchanger 12. Gas-nitrogen mixture discharges from the hot cyclone 11 is supplied via conduit 19 and crude gas-clean gas heat exchanger 12 into the fine dust separator 20. In the heat exchanger 12 the gas-nitrogen mixture which in the conduit 19 has a temperature of about 500° C., is reduced to about 200° C. by the indirect heat exchange with the clean gas coming from the desulphurizing plant 13. The fine dust separation in separator 20 is performed in conventional manner by means of a washer or disintegrator. The separated gas-nitrogen mixture is fed via conduit 21 in the desulfurizing plant 13 in which by means of an absorbtion/desorbtion process the gaseous sulphur compounds are removed from the gas-nitrogen mixture in conventional manner. In the desulphurizing process, the nitrogen contents has no negative effect. The cleaned gas-nitrogen mixture is supplied as the so-called clean gas through conduit 22 into the combustion chamber 14. As mentioned before, before entering the combustion chamber the temperature of the clean gas is adjusted in the crude gas-clean gas heat exchanger 12 to a value of about 300° to 600° C. Air and/or oxygen required for the combustion process is supplied in the chamber 14 through conduit 23. Hot pressurized boiler gas produced during the combustion is removed from the chamber 14 through conduit 24 and supplied to the subsequent non-illustrated gas-steam turbine power plant where it is depressurized during production of electrical power.

Dust particles or impurities separated from the gasnitrogen mixture in the hot cyclone 11 and fine dust separator 20 are removed through conduits 25 and 26 and discharged through conduit 27. In order to keep contents of $NO_x$ in the generated pressurized boiler gas as low as possible, it is of advantage when the temperature in the combustion chamber 14 is kept between about 600° and 700° C. To adjust accurately an optimum combustion temperature, nitrogen is blown through conduit 28 into combustion chamber 14, the nitrogen stream can also originate in the air decomposing station 3.

While the invention has been illustrated and described as embodied in connection with a specific example of a power plant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of operating a power plant including cooling a partial oxidation gas containing finely divided impurities, the gas being produced by partial oxidation of fuels in a gasifier at a temperature above slag melting point, and comprising the steps of quenching the crude gas exiting from the gasifier to a temperature in the range between 900° to 1,000° C. by the admixture of nitrogen and adjusting within said range the temperature of the gas-nitrogen mixture immediately below fusing or softening point of dust particles entrained in the mixture;

feeding the mixture into an indirect cooling system where the mixture is cooled down to a temperature between 900° to 500° C. and utilizing the exchanged heat for steam generation; then discharging the mixture from the indirect cooling system and cooling down the discharged mixture by the addition of further nitrogen to a temperature between 500° to 150° C.; the separating the finely divided impurities from the mixture;

desulphurizing the separated mixture;

feeding the clean mixture into a combustion chamber of a gas turbine of a combined gas-steam turbine power plant; said gas-steam turbine power flant including an air decomposing plant for delivering oxygen into said gasifier; and the nitrogen used for cooling the hot crude gas exiting from the gasifier and for cooling the gas-nitrogen mixture discharged from the indirect cooling system, being obtained from the air decomposing plant.

* * * * *